(12) United States Patent
Tan et al.

(10) Patent No.: US 10,029,896 B2
(45) Date of Patent: Jul. 24, 2018

(54) TOOL COUPLER HAVING COMPACT LOCKING CONFIGURATION

(71) Applicant: Caterpillar Inc., Peoria, IL (US)

(72) Inventors: Xiaoming Tan, Apex, NC (US); Michael Anthony Calamari, Raleigh, NC (US); Michael Scott Sekulich, Raleigh, NC (US); Bradley Robert Lancaster, Raleigh, NC (US)

(73) Assignee: Caterpillar Inc., Deerfield, IL (US)

( * ) Notice: Subject to any disclaimer, the term of this patent is extended or adjusted under 35 U.S.C. 154(b) by 456 days.

(21) Appl. No.: 14/573,278

(22) Filed: Dec. 17, 2014

(65) Prior Publication Data

US 2016/0176691 A1 Jun. 23, 2016

(51) Int. Cl.
 B66F 9/22 (2006.01)
 E02F 3/36 (2006.01)
 F16B 1/00 (2006.01)

(52) U.S. Cl.
 CPC .............. B66F 9/22 (2013.01); E02F 3/364 (2013.01); E02F 3/3627 (2013.01); E02F 3/3663 (2013.01); F16B 1/005 (2013.01)

(58) Field of Classification Search
 CPC ....... E02F 3/3663; E02F 3/3627; E02F 3/364; E02F 3/3631; E02F 3/3622; E02F 3/3636; F16B 1/005
 See application file for complete search history.

(56) References Cited

U.S. PATENT DOCUMENTS

| | | | | |
|---|---|---|---|---|
| 3,269,570 | A | * | 8/1966 | Wallberg .................. B60P 1/48 414/697 |
| 5,564,885 | A | * | 10/1996 | Staben, Jr. ............ E02F 3/3631 37/403 |
| 6,390,765 | B1 | | 5/2002 | Dick |
| 6,619,906 | B2 | * | 9/2003 | Dick ..................... E02F 3/3627 37/468 |
| 6,860,707 | B2 | | 3/2005 | Roan et al. |
| 6,866,467 | B2 | | 3/2005 | Dvorak et al. |
| 7,001,137 | B2 | | 2/2006 | Perrin et al. |
| 7,168,908 | B2 | * | 1/2007 | Diaz ..................... E02F 3/3627 37/468 |
| 7,182,546 | B1 | | 2/2007 | Kimble |
| 7,225,566 | B1 | * | 6/2007 | Kimble ................ E02F 3/3627 37/403 |
| 7,686,532 | B2 | * | 3/2010 | Kimble ................ E02F 3/3631 172/272 |

(Continued)

FOREIGN PATENT DOCUMENTS

| | | |
|---|---|---|
| CA | 2634070 | 9/2008 |
| EP | 0 278 571 | 10/1990 |
| EP | 0521560 | 1/1993 |

*Primary Examiner* — Matthieu F Setliff
(74) *Attorney, Agent, or Firm* — Finnegan, Henderson, Farabow, Garrett & Dunner, LLP

(57) ABSTRACT

A tool coupler for use in coupling a tool to a machine may have a frame with a first end receivable within the tool and a second end located opposite the first end. The tool coupler may also have a hydraulic cylinder pinned to the second end of the frame, and a wedge member pivotally connected to the hydraulic cylinder and configured to pass through the second end of the frame and selectively engage the tool. Engagement of the wedge member with the tool may inhibit disconnect of the first end of the frame from the tool.

10 Claims, 4 Drawing Sheets

(56) References Cited

U.S. PATENT DOCUMENTS

| | | | |
|---|---|---|---|
| 7,814,689 B2 | 10/2010 | Vering et al. | |
| 7,882,898 B1* | 2/2011 | Vering | E02F 3/3627 |
| | | | 172/272 |
| 8,833,480 B2* | 9/2014 | Grimes | E02F 3/3627 |
| | | | 172/272 |
| 2006/0245898 A1* | 11/2006 | Diaz | E02F 3/3627 |
| | | | 414/686 |
| 2010/0104359 A1* | 4/2010 | Seda | E02F 3/3631 |
| | | | 403/359.5 |
| 2011/0020061 A1* | 1/2011 | Vering | E02F 3/3627 |
| | | | 403/409.1 |
| 2012/0210613 A1* | 8/2012 | Seda | E02F 3/3631 |
| | | | 37/468 |
| 2012/0325505 A1* | 12/2012 | Grimes | E02F 3/3627 |
| | | | 172/272 |
| 2013/0302082 A1* | 11/2013 | Sikorski | E02F 3/3631 |
| | | | 403/33 |

\* cited by examiner

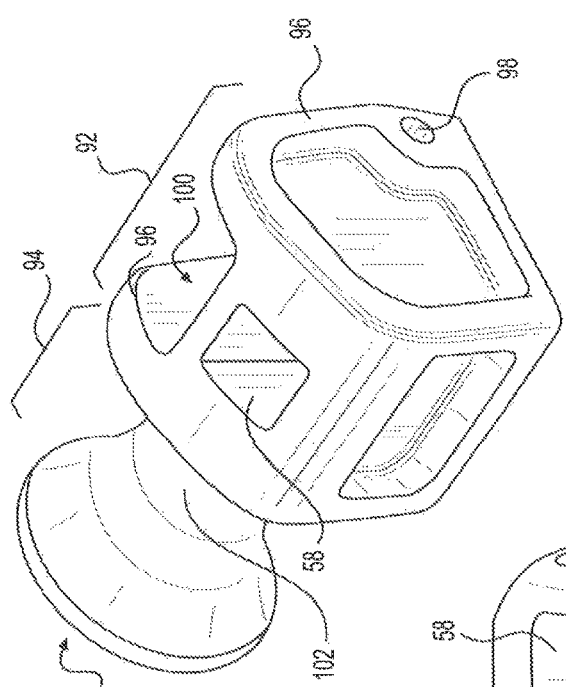
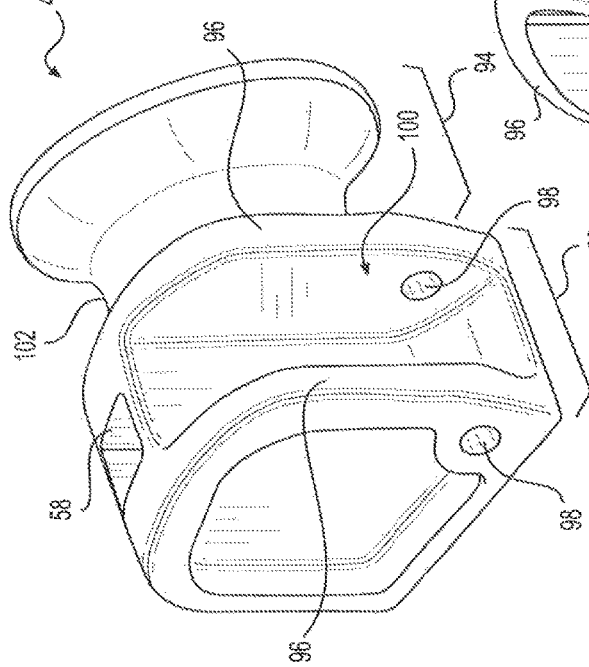
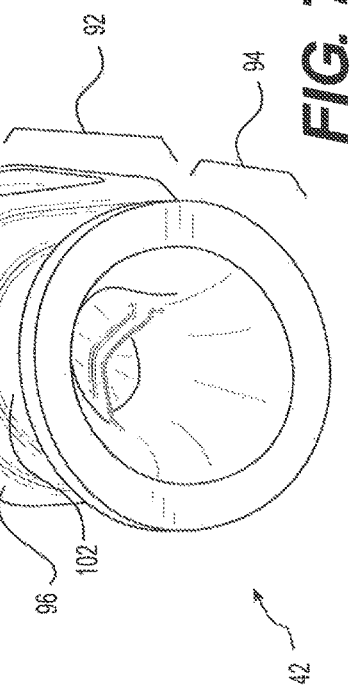

TOOL COUPLER HAVING COMPACT LOCKING CONFIGURATION

TECHNICAL FIELD

The present disclosure relates generally to a tool coupler and, more particularly, to a tool coupler having a compact locking configuration.

BACKGROUND

A tool coupler can be used to increase the functionality and versatility of a host machine by allowing different tools to be quickly and interchangeably connected to linkage of the machine. Tool couplers generally include a frame rigidly attached to linkage of the machine, and the tools each have an identical set of hooks that engage a tube of the frame. A lock is mounted to the tool coupler and inhibits undesired disengagement of the hooks.

An exemplary tool coupler is disclosed in U.S. Pat. No. 7,814,689 of Vering et al. that issued on Oct. 19, 2010 ("the '689 patent"). The tool coupler of the '689 patent includes a frame formed from a plurality of vertical plate-shaped members, a tube connecting first ends of the plate-shaped members, and a box that connects second ends of the plate-shaped members. The tool coupler also includes hydraulic cylinders pinned to the plate-shaped members at the first end, and a separate wedge pivotally connected to each of the hydraulic cylinders. The wedges are configured to pass through square holes in the box during extension of the hydraulic cylinders to engage an associated tool.

Although the tool coupler of the '689 patent may adequately support an associated tool, it may not be optimal. In particular, the location and configuration of the hydraulic cylinders and wedges may block an operator's view of the associated tool.

The tool coupler of the present disclosure addresses one or more of the needs set forth above and/or other problems of the prior art.

SUMMARY

One aspect of the present disclosure is directed to a tool coupler for coupling a tool to a machine. The tool coupler may include a frame with a first end receivable within the tool and a second end located opposite the first end. The tool coupler may also include a hydraulic cylinder pinned to the second end of the frame, and a wedge member pivotally connected to the hydraulic cylinder and configured to pass through the second end of the frame and selectively engage the tool. Engagement of the wedge member with the tool may inhibit disconnect of the first end of the frame from the tool.

Another aspect of the present disclosure is directed to a mounting base for a tool coupler having a hydraulic cylinder and a wedge member pivotally connected to the hydraulic cylinder. The mounting base may include a box portion forming a guide for the wedge member and having flanges configured to receive a pin that passes through an end of the hydraulic cylinder. The mounting base may also include a cylindrical portion extending from one side of the box portion.

Yet another aspect of the present disclosure is directed to a machine. The machine may include a body, lift arms pivotally connected to the body, and a tilt arm pivotally connected to the lift arms. The machine may also include a tool coupler having a frame pivotally connected to the lift arms and to the tilt arm. The frame may include a base assembly, a tube, and a plurality of side plates extending from the base assembly to the tube. The tool coupler may also have a first hydraulic cylinder pinned to the base assembly, and a first wedge member pivotally connected to the first hydraulic cylinder and configured to pass through a first guide of the base assembly during retraction of the first hydraulic cylinder. The tool coupler may further have a second hydraulic cylinder pinned to the base assembly, and a second wedge member pivotally connected to the second hydraulic cylinder and configured to pass through a second guide of the base assembly during retraction of the second hydraulic cylinder. The machine may further include a tool having a base, a top, a front side, a backside, and hooks protruding rearward from the top to engage the tube of the tool coupler frame. A tip of the tool at the front side may be visible through the frame of the tool coupler at vertical locations between the tube and the first and second hydraulic cylinders.

BRIEF DESCRIPTION OF THE DRAWINGS

FIGS. 5-7 are isometric illustrations of an exemplary disclosed mounting base that may form a portion of the hydraulic lock of FIG. 4.

DETAILED DESCRIPTION

Figure 1:
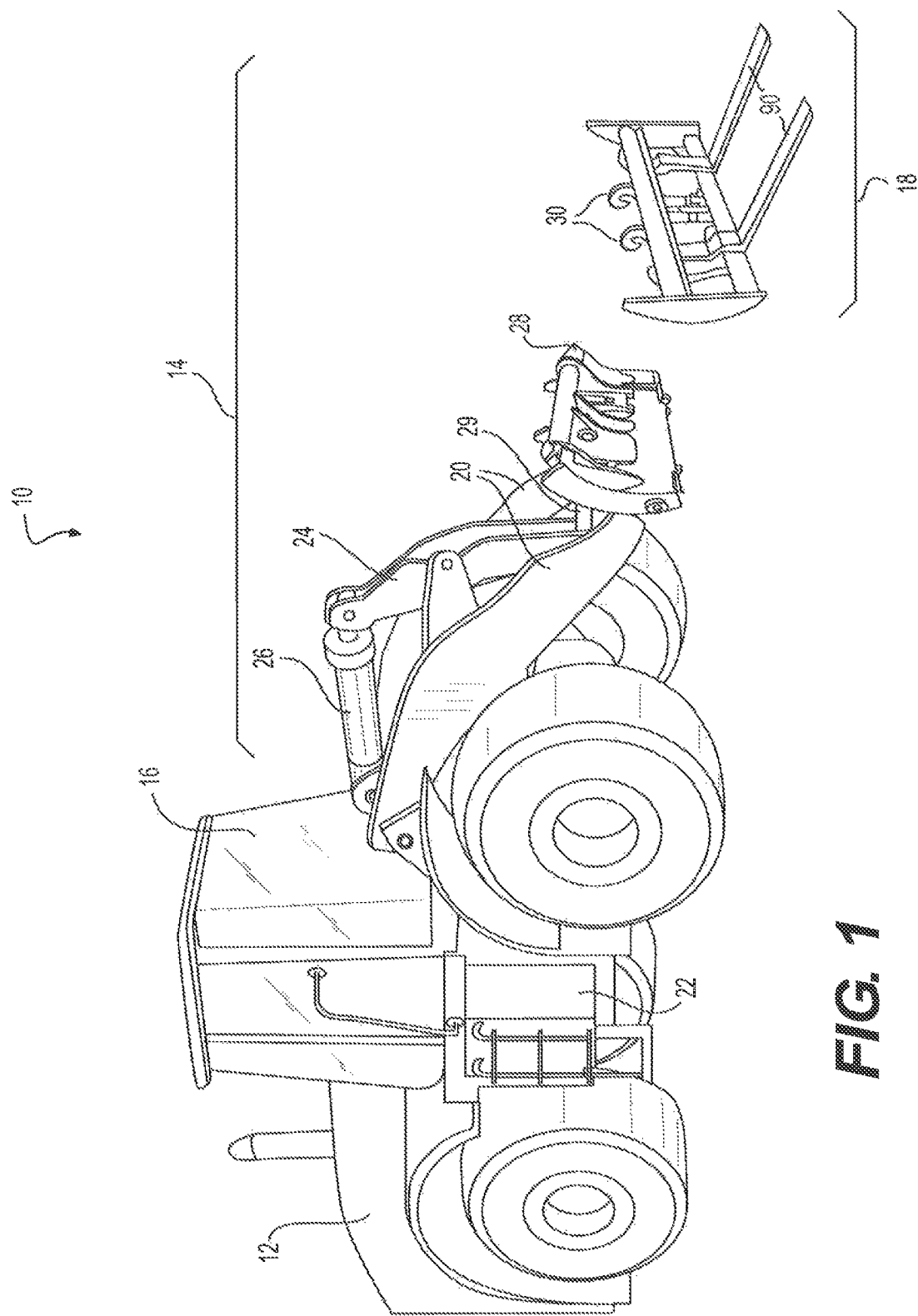
FIG. 1 is an isometric illustration of an exemplary disclosed machine.

FIG. 1 illustrates an exemplary machine 10. Machine 10 may be a fixed or mobile machine that performs some type of operation associated with an industry, such as mining, construction, farming, transportation, or any other industry known in the art. For example, machine 10 may be a material moving machine such as a loader (shown in FIG. 1), a backhoe, an excavator, or a motor grader. Machine 10 may include a power source 12, a tool system 14 driven by power source 12, and an operator station 16 situated for manual control of power source 12 and/or tool system 14.

Tool system 14 may include linkage acted on by hydraulic cylinders to move a tool 18. Specifically, tool system 14 may include one or more lift arms 20 (two shown in FIG. 1) that are vertically pivotal relative to a body or machine frame 22 by a pair of adjacent, double-acting, hydraulic cylinders (not shown). Tool system 14 may also include a tilt arm 24 that is connected at a center point to lift arms 20 and vertically pivotal by a single, double-acting, hydraulic cylinder 26. With this configuration, tool 18 may be raised or lowered via lifting of lift arms 20, and dumped or racked via the tilting of tilt arm 24. It should be noted that other configurations of tool system 14 may also be possible.

Numerous different tools 18 may be attachable to a single machine 10 and controllable via operator station 16. Each tool 18 may include a device used to perform a particular task such as, for example, a fork arrangement (shown in FIG. 1), a bucket, a blade, a grapple, or any other task-performing device. Although connected in the embodiment of FIG. 1 to lift and pivot relative to machine 10, tool 18 may additionally rotate, slide, swing, or move in any other manner known in the art.

Tool system 14 may also include a tool coupler 28 located to facilitate a quick connection between the linkage of tool system 14 and tool 18. In particular, tool coupler 28 may be pivotally connected to lift arms 20 and to tilt arm 24 (e.g., by way of a power link 29), and selectively connectable to hooks 30 of tool 18. Thereafter, tool coupler 28 may be hydraulically locked (as will be explained in more detail below) to inhibit unintentional release of tool coupler 28 from hooks 30 during subsequent use of tool 18

Figure 2:
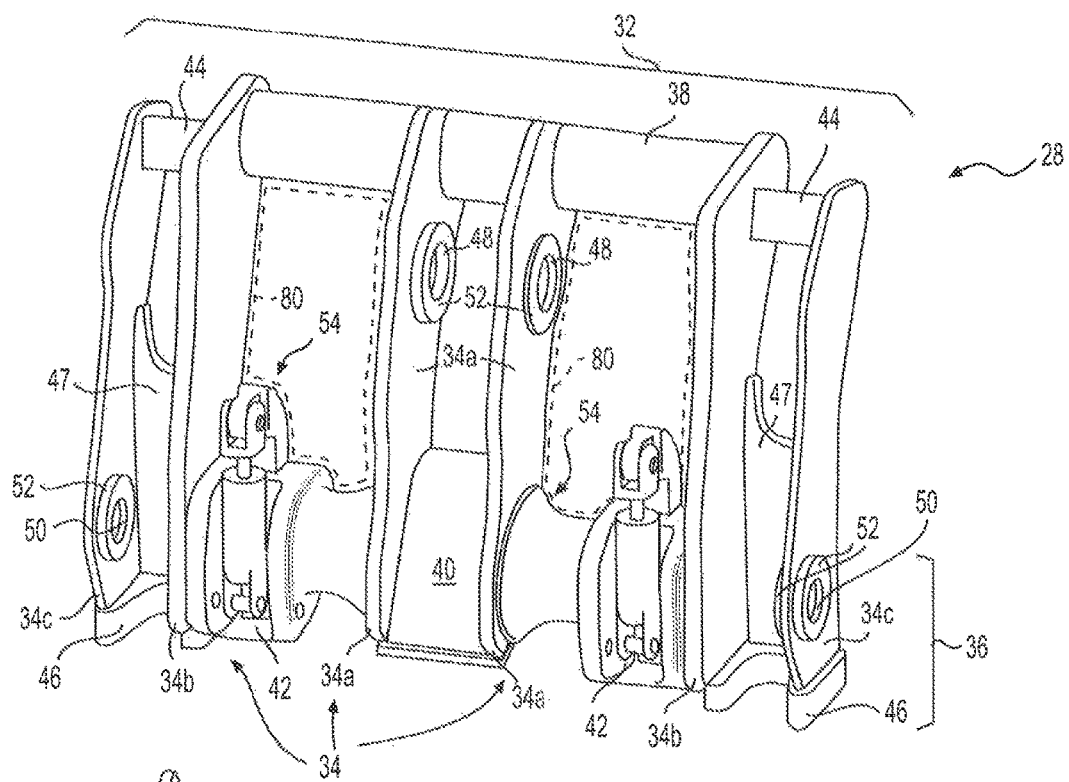
FIG. 2 is an isometric illustration of an exemplary disclosed tool coupler that may be used with the machine of FIG. 1.

As shown in FIG. 2, tool coupler 28 may include a frame 32 having spaced-apart parallel side plates ("plates") 34 that extend lengthwise between a base assembly 36 and a tube 38. Plates 34 may be divided into pairs, including an inside pair 34a, a first outside pair 34b, and a second outside pair 34c. Plates 34a may be notched at an upper end to receive a mid-portion of tube 38, whereas plates 34b may encompass opposing ends of tube 38. Plates 34a may be connected to each other at a lower end via a center spacer 40. Plates 34a may be connected at their lower ends to adjacent plates 34b via two separate mounting bases 42, and at their upper ends by way of tube 38. Plates 34c may be connected to adjacent plates 34b via upper and lower spacers 44, 46, respectively. In some embodiments, a vertical web 47 may also be located between one or more of plates 34, if desired, to help stiffen frame 32. The different components of frame 32 may be welded to each other.

Frame 32 may be connected to the linkage of tool system 14 via pins (not shown). In particular, inner plates 34a may each include a pin bore 48 configured to receive a pin of power link 29. Similarly, outer plates 34c may each include a pin bore 50 configured to receive a pin of each lift arm 20. Raised bosses 52 may be formed at each pin bore 48, 50, if desired, to facilitate spacing and/or to increase a strength of plates 34.

As also shown in FIG. 2, tool coupler 28 may be provided with one or more hydraulic locks 54 configured to inhibit release of tool 18 from tool coupler 28. In the disclosed embodiment, two hydraulic locks 54 are included (one associated with each of mounting bases 42). It is contemplated that a single hydraulic lock 54 could alternatively be utilized, if desired.

Figure 4:
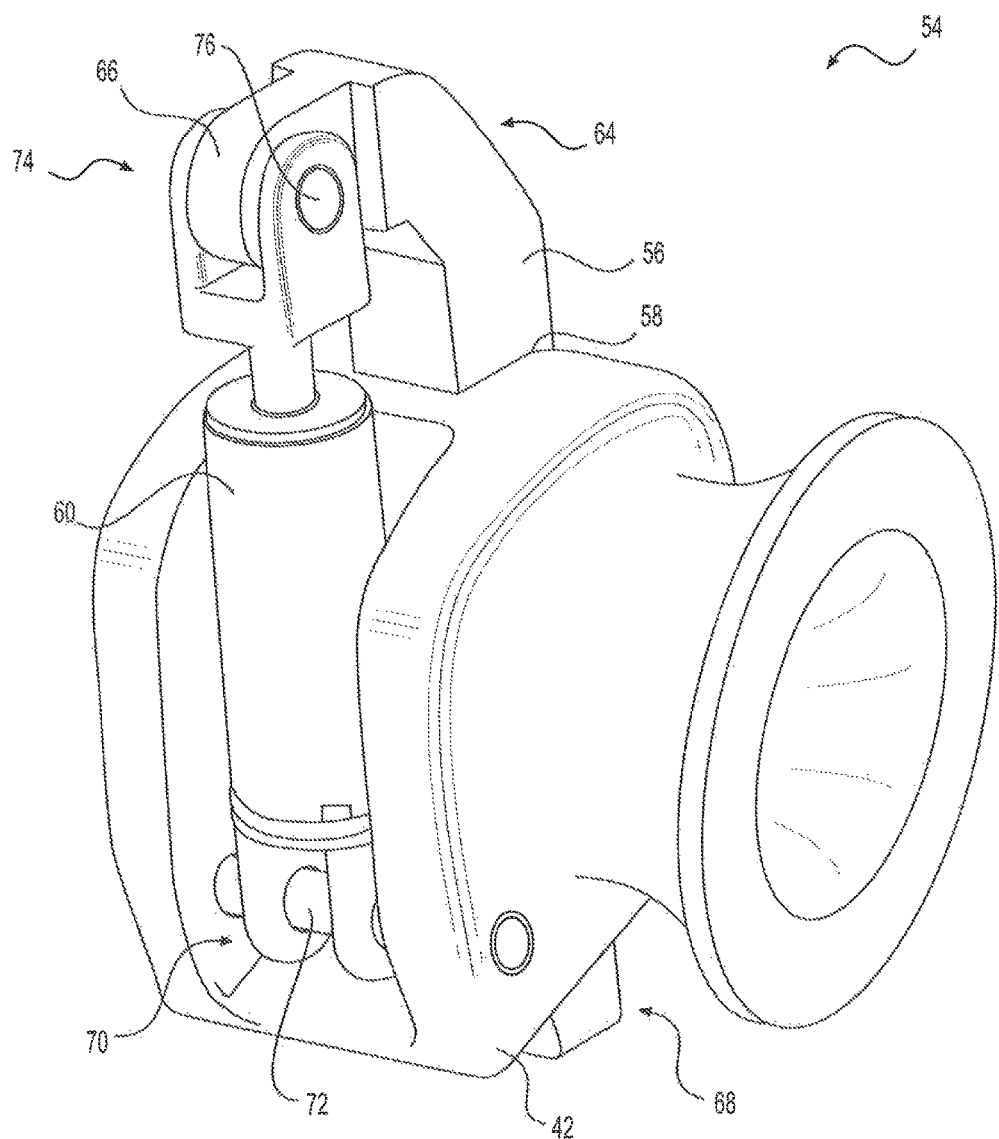
FIG. 4 is an isometric illustration of an exemplary disclosed hydraulic lock that may form a portion of the tool coupler of FIG. 2.

An exemplary hydraulic lock 54 is shown in FIG. 4 as having multiple interconnected and movable components. For example, hydraulic lock 54 may include, among other things, a wedge member 56 that is slidingly disposed within a vertical guide 58 of mounting base 42, and a hydraulic cylinder 60 that is generally parallel with and mounted adjacent to guide 58. Wedge member 56 may include a base end 64 having an offset ear 66, and a tapered tip end 68. Hydraulic cylinder 60 may include a head end 70 pivotally connected to mounting base 42 via a pin 72, and a rod end 74 pivotally connected to ear 66 of wedge member 56 via a pin 76. With this configuration, an extension of hydraulic cylinder 60 may result in tip end 68 of wedge member 56 being pulled upward out of guide 58, and a retraction of hydraulic cylinder 60 may result in tip end 68 being pushed downward into guide 58. It should be noted that wedge member 56 does not leave guide 58 during operation of machine 10.

Figure 3:
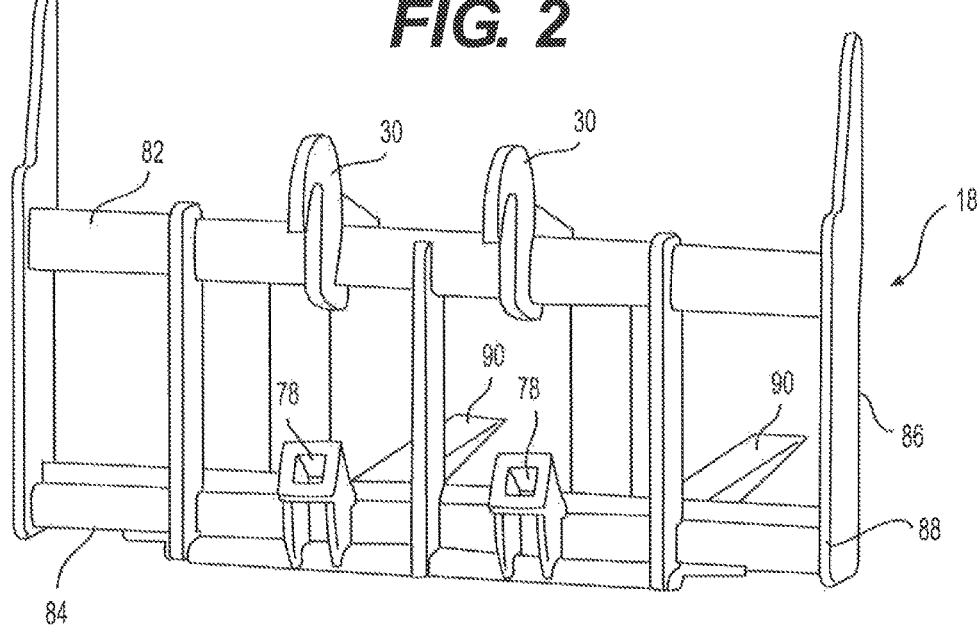
FIG. 3 is an isometric illustration of an exemplary tool that may be selectively connected to the tool coupler of FIG. 2.

As shown in FIG. 3, tool 18 may include pockets 78 configured to receive tip ends 68 of wedge members 56. Specifically, as wedge members 56 are pushed downward through guides 58 by hydraulic cylinders 60, tip ends 68 may eventually protrude from mounting bases 42 and enter pockets 78. When tip ends 68 are located within pockets 78, there may not be enough vertical space between pockets 78 and hooks 30 to allow portions of tool coupler 28 (e.g., tube 38) to be released from hooks 30. Only when tip ends 68 are pulled back out of pockets 78 by hydraulic cylinders 60, can base assembly 36 of tool coupler 28 be rotated away from tool 18 to create vertical space sufficient for the release of tube 38 from hooks 30.

The location and arrangement of hydraulic cylinders 60 and wedge members 56 may create windows 80 (represented in FIG. 2, with dashed lines) that allow an operator of machine 10 to view work tool 18 through tool coupler 28. In the example of work tool 18 being a fork arrangement (as shown in FIGS. 1 and 3), work tool 18 may include a top 82, a bottom 84, a front side 86, a back side 88, and tines 90 that extend forward from front side 86. With this configuration, there may be applications where locating the tip ends of tines 90 is critical (e.g., when picking up unbalanced and/or delicate loads). With the disclosed tool coupler 28, the tip ends of tines 90 may be visible to the operator of machine 10 via windows 80.

The arrangement of hydraulic cylinders 60 and wedge members 56 may be facilitated via a unique configuration of mounting bases 42. In particular, as shown in FIGS. 5-7, mounting base 42 may include a box portion 92, and a cylindrical portion 94 extending from a side of box portion 92. Box portion 92 may house guide 58, and also include flanges 96 that protrude rearward away from guide 58 (relative to the normal operational orientation of tool coupler 28). Flanges 96 may each have a bore 98 formed therein at a lower corner that together are configured to receive pin 72 (referring to FIG. 4). In addition, flanges 96 may together form a three-sided longitudinal recess 100 (with the rest of box portion 92) that receives and functions to protect hydraulic cylinder 60 from damage. In one embodiment, recess 100 may be long enough to encompass a majority (if not all) of a tube portion of hydraulic cylinder 60. Cylindrical portion 94 may function primarily as a support that allows connection of box portion 92 to inner plates 34a (referring to FIG. 2). In addition, cylindrical portion 94 may function as a spacer to allow for box portion 92 (along with wedge member 56 and hydraulic cylinder 60) to be positioned further outward (relative to a crosswise center of tool coupler 28). This positioning of box portion 92 may move wedge member 56 and hydraulic cylinder 60 further out of a line-of-sight of the operator to the tip ends of tines 90.

Guide 58 may be generally aligned with a length direction of recess 100, and located adjacent recess 100 (e.g., between recess 100 and tool 18). With this arrangement, hydraulic cylinder 60 may be folded over and lie generally within the same vertical and horizontal space as wedge member 56, thereby reducing an amount of window 80 (referring to FIG. 2) consumed by these components. In the disclosed embodiment, guide 58 is a hole or bore having a cross-section that inhibits rotation of wedge member 56. Although shown as having a square cross-section, it is contemplated that guide 58 could have another cross-section (e.g., rectangular, triangular, or semi-circular), if desired.

Cylindrical portion 94 may be shaped to enhance a view through window 80. In particular, cylindrical portion 94 may have a smallest diameter at a base end near box portion 94, where a more direct line-of-sight from the operator to the tip ends of times 90 may be located. In addition, cylindrical portion 94 may have a generally concave cross-section (i.e., flare outward to a distal end) to reduce intrusion into window 80. Box and cylindrical portions 92, 94 may be integrally formed through a casting process.

INDUSTRIAL APPLICABILITY

The presently disclosed tool coupler may be applicable to a variety of machines to increase the functionality of the machines. For example, a single loader may be used for moving goods, dirt, rock and other materials. And during these operations, different implements may be required, such as forks, different sizes of buckets, or a broom. The disclosed tool coupler can be used to quickly change from one implement to another with ease, thus reducing the time during which the machine is unavailable for its intended purpose. And because the disclosed tool coupler may provide a view of critical areas of the tool through the tool coupler, use of the tools may be enhanced. Operation of tool coupler 28, with reference to FIGS. 1-3, will now be explained.

To connect tool coupler 28 to tool 18, tool coupler 28 may be pivoted forward to a full dump orientation (e.g., via counterclockwise tiling of tilt arm 24—as seen in the perspective of FIG. 1) and then lifted so that tube 38 enters into rear-facing hooks 30 of tool 18 (e.g., via raising of lift arms 20). Tool coupler 28 may then be pivoted rearward to a full rack orientation (e.g., via clockwise tiling of tilt arm 24) until guides 58 of tool coupler 28 (i.e., of mounting bases 42) generally align with pockets 78 in tool 18. Thereafter, a command may be issued by the operator of machine 10 from inside station 16 to hydraulically lock tool coupler 28 to tool 18. In response to this command, hydraulic cylinders 60 may retract, thereby pushing wedge members 56 downward through guide 58 and into pockets 78. Once wedge members 56 are inside pockets 78, tube 38 may not be removed from hooks 30.

To remove tool coupler 28 from tool 18, the operator may issue the command for hydraulic cylinders 60 to extend. This extension may function to pull wedge members 56 upward out of pockets 78 and through guides 58. Once wedge members 56 clear pockets 78, tool coupler 28 may be pivoted forward to the full dump orientation and then lowered so that tube 38 falls out of hooks 30.

It will be apparent to those skilled in the art that various modifications and variations can be made to the tool coupler of the present disclosure without departing from the scope of the disclosure. Other embodiments will be apparent to those skilled in the art from consideration of the specification and practice of the tool coupler disclosed herein. It is intended that the specification and examples be considered as exemplary only, with a true scope of the disclosure being indicated by the following claims and their equivalent.

What is claimed is:

1. A tool coupler for attaching a tool to a linkage system of a machine, the tool coupler comprising:
    a frame including an upper tube, a base assembly opposite the upper tube, and a plate assembly extending between the upper tube and the base assembly, and
    a locking assembly configured for operatively securing the tool with the tool coupler,
    the plate assembly including an inside pair of plates extending between the base assembly and the upper tube, a first outside pair of plates extending between the base assembly and the upper tube, and a second outside pair of plates extending between the base assembly and the upper tube, the inside pair of plates being positioned between the first outside pair of plates and the first outside pair of plates being positioned between the second outside pair of plates,
    the base assembly including a mounting base positioned between one of the inside pair of plates and one of the first outside pair of plates, the mounting base including a box portion and a tapered cylindrical portion, the box portion positioned adjacent the one of the first outside pair of plates and including a vertical guide and a recess, and the tapered cylindrical portion positioned adjacent the one of the inside pair of plates and including a smallest diameter at a base end near the box portion,
    the locking assembly including an actuator and a wedge secured to the actuator, the actuator positioned within the recess of the box portion of the mounting base and the wedge positioned within the vertical guide of the box portion of the mounting base, the actuator and wedge being configured to selectively move the wedge into engagement with the tool for securing the tool with the tool coupler.

2. The tool coupler of claim 1, the actuator lying within the same vertical and horizontal space as the wedge.

3. The tool coupler of claim 2, the wedge including a base end having an offset ear attached to the actuator.

4. The tool coupler of claim 3, the actuator being a hydraulic cylinder.

5. The tool coupler of claim 1, the tapered cylindrical portion of the mounting base having a concave cross-section.

6. The tool coupler of claim 1, each of the inside pair of plates defining a bore for receiving a pin of the linkage system of the machine.

7. The tool coupler of claim 6, each of the second outside pair of plates defining a bore for receiving a pin of the linkage system of the machine.

8. The tool coupler of claim 1, further comprising a window formed between the tube and the mounting base, and between the one of the inside pair of plates and the one of the first outside pair of plates.

9. The tool coupler of claim 1, the recess and guide extending parallel with each other, with the guide being positioned in front of the recess.

10. The tool coupler of claim 1, the recess and guide being positioned the same distance from the one of the inside pair of plates.

* * * * *